US007044341B2

(12) United States Patent
Sanchez

(10) Patent No.: US 7,044,341 B2
(45) Date of Patent: May 16, 2006

(54) DEVICE FOR PACKAGING AND DISPENSING A PRODUCT, SUCH AS A COSMETIC PRODUCT

(75) Inventor: Marcel Sanchez, Aulnay-Sous-Bois (FR)

(73) Assignee: L'Oreal, Paris (FR)

( * ) Notice: Subject to any disclaimer, the term of this patent is extended or adjusted under 35 U.S.C. 154(b) by 320 days.

(21) Appl. No.: 10/106,251

(22) Filed: Mar. 27, 2002

(65) Prior Publication Data

US 2002/0145005 A1 Oct. 10, 2002

(30) Foreign Application Priority Data

Mar. 27, 2001 (FR) .................................. 01 04091

(51) Int. Cl.
*G01F 11/00* (2006.01)

(52) U.S. Cl. ................ 222/404; 222/321.6; 222/321.8; 222/402.13

(58) Field of Classification Search ............. 222/321.6, 222/321.8, 404, 402.13, 571
See application file for complete search history.

(56) References Cited

U.S. PATENT DOCUMENTS

| | | | | |
|---|---|---|---|---|
| 2,678,846 | A | 5/1954 | Rogers et al. | 299/95 |
| 3,361,304 | A * | 1/1968 | Thompson | 222/190 |
| 3,739,941 | A * | 6/1973 | Ostrwosky et al. | 222/153.11 |
| 3,782,605 | A | 1/1974 | Messenger | 222/153 |
| 3,915,354 | A | 10/1975 | Lo | 222/402.11 |
| 4,315,576 | A * | 2/1982 | Murphy et al. | 220/282 |
| 5,069,368 | A * | 12/1991 | Godard et al. | 222/321.9 |
| 5,152,425 | A | 10/1992 | Baudin | 222/1 |
| 6,578,573 | B1 * | 6/2003 | Koch | 128/202.27 |

FOREIGN PATENT DOCUMENTS

| | | |
|---|---|---|
| EP | 0 586 963 A2 | 3/1994 |
| FR | 2 661 116 | 10/1992 |
| JP | 10-316183 | 12/1998 |
| JP | 2000-189855 | 7/2000 |
| WO | 00/81454 | 10/2000 |

* cited by examiner

*Primary Examiner*—Philippe Derakshani
(74) *Attorney, Agent, or Firm*—Oblon, Spivak, McClelland, Maier & Neustadt, P.C.

(57) ABSTRACT

The present application relates to a device (1) for packaging and dispensing a pressurized product, comprising: a) a container (2, 70) containing the product: b) a dispensing element (5, 75) fitted to the container and provided with an activating member (6, 74) that can be moved along a longitudinal axis X of the dispensing element; and c) a dispensing head (10) mounted on the container by means of a collar (20). The dispensing head comprises an actuating member (40) that can be moved relative to the collar, and the coupling between the collar (20) and the actuating member (40) being such that rotating the latter (40) relative to the collar (20) causes a displacement of the activating member (6, 74) along the axis X and dispenses the product through at least one outlet orifice (46) of the dispensing head.

Figure of the drawing to be published with the abstract: FIG. 4

87 Claims, 4 Drawing Sheets

Fig. 1
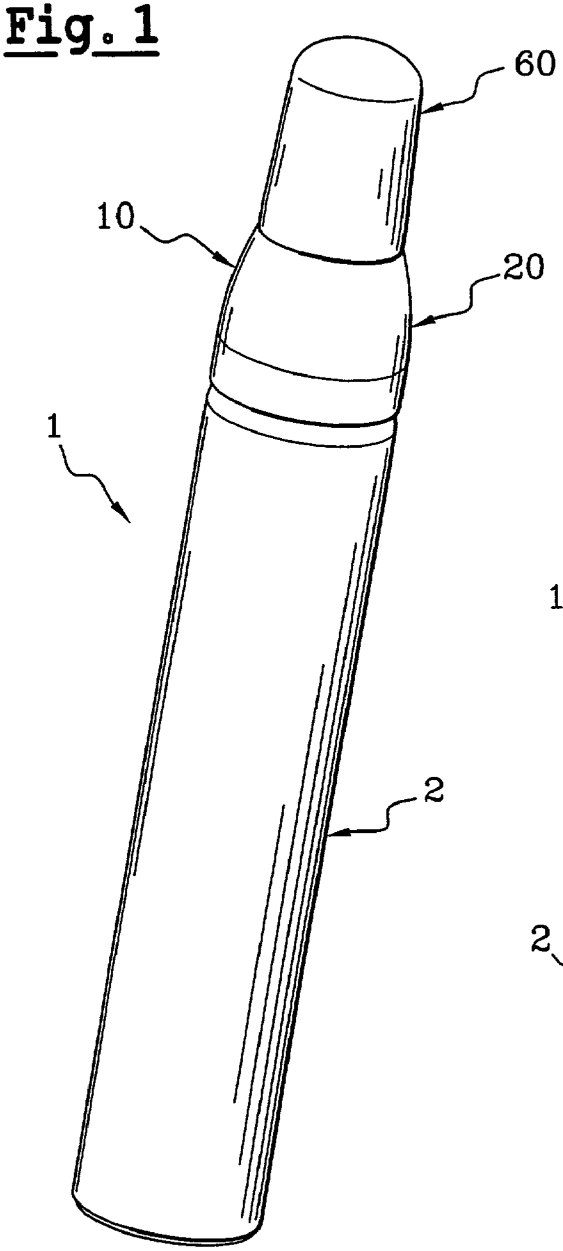
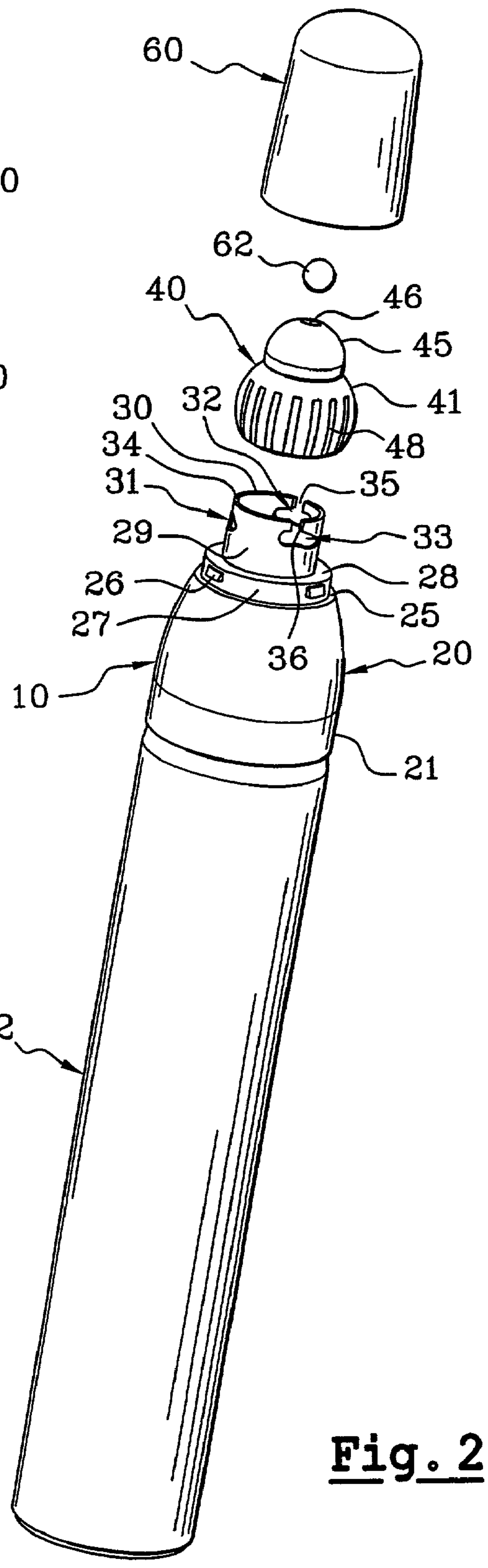
Fig. 2

Fig. 3
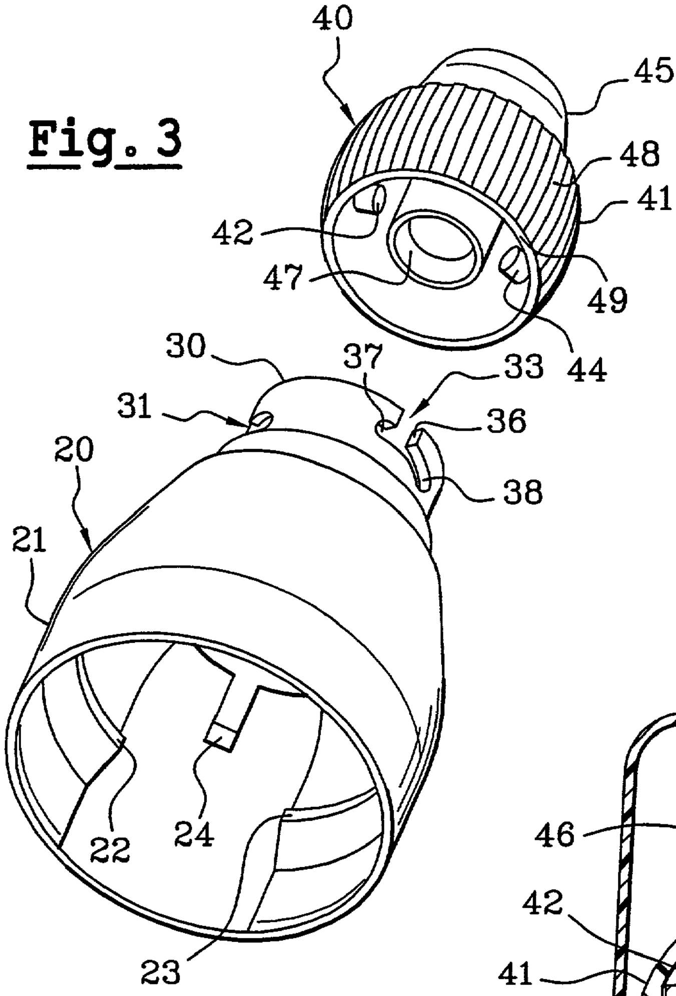
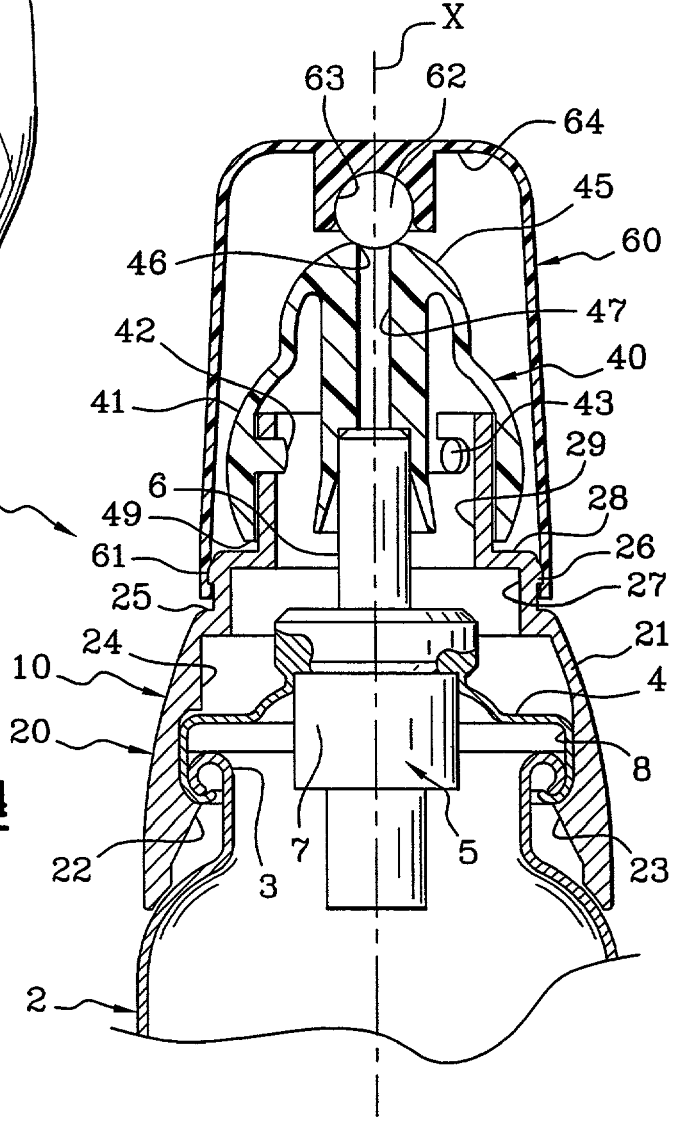
Fig. 4

DEVICE FOR PACKAGING AND DISPENSING A PRODUCT, SUCH AS A COSMETIC PRODUCT

The present invention relates to a device for packaging and dispensing a product, such as a cosmetic or dermatological product. Such a product can be dispensed in particular in the form of a cream, a gel, a foam or a spray.

With such devices the product can be packaged in pressurized form using a gas introduced into the container containing the product, the gaseous propellant being mixed with the product or separate from the product, with pressurized dispensing taking place through an aerosol type valve.

Alternatively the product may be pressurized during dispensing by means of a manually actuated pump.

Generally speaking, in pressurized devices using a valve the product is dispensed in response to pressure applied either axially (push-in valve) or laterally (tilt valve) to an actuating member in the form of a push button, also known as a "spray head". Such a push button can be moved relative to a mounting collar which is fixed to the container. Pressure on the actuating member causes displacement (depression or tilting) of an activating member in the form of a valve stem, expelling the product through an outlet orifice provided in the spray head. When the actuating pressure is removed, a return means, such as a spring, forces the activating member into the valve-closed position.

In the case of a pump, the pump is usually actuated by applying pressure axially to a push button, this pressure causing axial displacement of an activating member. The activating member is connected to a piston, displacement of which inside the pump body in one direction expels product under pressure, and in the other direction draws product into the pump body. The piston is usually biased towards its position corresponding to maximum volume of the pumping chamber by a spring.

The configuration of these conventional devices is such that it is sometimes difficult to actuate the pump or valve with one hand and collect the dispensed product with the same hand, and yet this may be desirable, especially with certain products in the form of a cream or a gel.

Independently of the ability to both actuate and collect the dispensed product with the same hand, it may be desirable, particularly in the cosmetic field, to permit a hand action which is quite simply different from conventional hand actions.

FR-2-661 116 discloses a device equipped with a manually actuated pump. Product is dispensed by applying pressure axially to a push button. The push button is connected to a steep slope and is configured in such a may that the axial pressure applied to the push button depresses the pump rod and expels the product through an outlet orifice. At the same time as the pump rod is being depressed, the push button is caused to rotate through about 30° in such a way as to bring about a corresponding angular displacement of the product spray.

In the above document, the steep slope formed by the collar means that it is impossible directly to rotate the push button relative to the collar. The rotation of the push button can only be the resultant of the axial pressure applied to the push button. It is the axial pressure that simultaneously both actuates the pump and also rotates the push button as the product comes out. In other words, in the above document the rotation is only an induced movement and not an initiating movement.

It follows then that the hand action of the user is identical to that of the conventional pumps described above.

It is therefore one of the objects of the invention to provide a device for packaging and dispensing a product, such as a cosmetic product, under pressure, that permits a hand action by the user that differs from that of conventional devices.

It is a particular object of the invention to provide such a device in which the dispensing element can be actuated by a rotary movement applied directly by the user to an actuating member.

It is another object of the invention to provide such a device that allows the same hand both to dispense the product and collect the product so dispensed.

It is still another object of the invention to provide such a device that is simple to sue and inexpensive to manufacture.

Still other objects will be found in the following detailed description.

According to the invention, these objects are achieved by providing a device for packaging and dispensing a product, such as a cosmetic product, comprising:

a) a container containing the product;

b) a dispensing element fitted to the container and provided with an activating member that can be moved along a longitudinal axis of the dispensing element; and c) a dispensing head mounted on the container by means of a collar, the dispensing head comprising an actuating member that can be moved relative to the collar, and the connection between the collar and the actuating member being such that rotating the latter relative to the collar causes a displacement of the activating member along the axis X and dispenses the product through at least one outlet orifice of the dispensing head.

In this way the rotary movement applied directly to the actuating member by the user produces an axial movement of the activating element and, as a result, actuates the dispensing element and expels the pressurized product through the outward orifice. Consequently the hand action of the user of the device according to the invention is significantly different from the hand action of the conventional devices referred to earlier.

This configuration is the opposite of that described in FR-A-2 661 116 whereby the movement applied directly by the user to the push button is an axial movement, and this axial movement actuates the dispensing element and induces the rotary movement of the push button. The rotary movement induced in the push button plays no part in initiating the actuation of the pump.

In the case of a valve in which the actuating stroke may be of the order of 0.5 mm, actuation can arise from a rotation of a few degrees of the actuating member relative to the collar.

In the case of a pump in which the actuating stroke may be of the order of 2 mm or more, actuation of the pump can arise from a rotation of between 10° and 50°, preferably around 30°. The angle of rotation depends to a large extent on the configuration of the connection between the actuating member and the collar.

When the actuating action is discontinued, the activating member is pushed back up axially by a return means (helical spring) acting on the dispensing element, and automatically turns the actuating member in the opposite direction to that in which it was rotated to actuate the dispensing element. However, an auxillary return means may be provided to return the actuating member in its reverse rotary movement.

The axial displacement of the activating member preferably results from the rotation of the actuating member about the longitudinal axis. This characteristic greatly simplifies the design of the dispensing head.

In one specific embodiment, the device comprises at least one driving element, for example in the form of a pin, formed by the actuating member (or conversely by the collar) and able to engage with at least one guide element formed by the collar (or conversely by the actuating member), the at least one guide element each comprising a ramp so configured as to cause the axial displacement of the activating member when the actuating member is rotated.

The at least one guide element may be made in the form of a window passing through a side wall of the collar, its profile being a function of the desired ramp profile and a function of the desired speed of opening.

As an indication, the average slope of the at least one ramp is less than 50%, and preferably less than 30%.

The engagement of a driving element with its associated guide means may be effect via an opening leading to a free edge of the collar.

In a preferred embodiment, the at least one driving element is formed by the actuating member, the at least one guide element being formed by the collar.

The device according to the invention advantageously comprises a plurality of driving elements, especially three, spaced out at regular intervals, each associated with a corresponding guide element. Such a plurality of driving elements, and of associated guide elements, greatly facilitates the rotating of the actuating member and the actuation of the valve or pump.

The actuating member is rotatable relative to the collar between a first angular position and a second angular position, and the connection between the actuating member and the collar may be such that the rotation of the actuating member between the first position and an intermediate position between the first and second positions causes little or no axial displacement of the activating member. The position of the driving means between the first position and the intermediate position constitutes a "locked" zone of the device, in which the risk of accidental actuation of the dispensing element, e.g. when putting on a cap (optional), are greatly reduced.

The "locked" zone may be separated from the ramp by a notch which is overcome by a click action. The notch may be overcome automatically by the return force of the pump or valve, or manually by the user. For certain products at least, such a notch makes the presence of an auxiliary cap still less essential.

For this purpose, when the actuating member is rotated between the first position and the intermediate position, the at least one driving element may be in engagement with a portion of the corresponding guide element that is approximately perpendicular to the longitudinal axis and that is upstream of the ramp of the corresponding guide element. The opening through which the driving element is placed in engagement with the guide element is preferably offset angularly from the most upstream edge of the guide element, so that when the driving element is in abutment against the upstream edge (the rest or storage position), the actuating member cannot be detached from the collar merely by pulling on the actuating member.

The outlet orifice preferably lies on the longitudinal axis. This arrangement further facilitates the actuation of the dispensing element and the collecting of the dispensed product in the same hand.

The actuating member advantageously comprises reliefs, in the form of bands for example, which can make it easy to rotate relative to the connecting collar. Such bands are preferably oriented parallel to the axis of rotation of the actuating member.

A removable cap may be provided for covering the outlet orifice in the storage position of the device.

The removable cap may comprise means, in the form of for example an elastomeric ball, which, in the closed position of the cap, seal the outlet orifice. Since the dispensing element is actuated by rotating the actuating member, the risk of accidentally actuating the dispensing element when putting on the cap, and especially when the sealing means are coming into engagement with the outlet orifice, are very greatly reduced.

The dispensing element may be an aerosol type valve. If so, the container may be in the form of a can made of melt or a thermoplastic material. The valve may be of the "male" type, in which case the activating member consists of a hollow rod projecting out of the valve body and having a part inside the valve body that opens and closes the valve.

Alternatively, the valve is of "female" type, in which case the activating member consists of an opening/closing element entirely contained within the valve body, with which a tubular portion of the actuating member, which is in communication with the outlet orifice, comes into engagement.

In another embodiment, the dispensing element is a manually actuated pump. The container may be made of, among other things, glass or a thermoplastic material.

The collar, the actuating member, and the cap (if any) may be molded in thermoplastic materials such as a polypropylene, a polyethylene terephthalate, or a polyvinyl chloride.

The device according to the invention may advantageously be used for packaging and dispensing a cosmetic or dermatological product, especially in the form of a cream, a foam, a gel or a spray. The product may be, for example, a personal hygiene product, a hair styling product, a hair dyeing product, a skin or hair care product, make-up, or a sunscreen product.

Aside from the arrangements set out above, the invention consists of a number of other arrangements which are explained below apropos of a number of non-restrictive illustrative embodiments described with reference to the accompanying figures, of which:

FIG. 1 is a general view of the device in one embodiment of the invention;

FIG. 2 shows the device seen in FIG. 1 in an exploded view;

FIG. 3 is another exploded view of only a portion of the device seen in FIG. 1;

FIG. 4 is a cross section through the device seen in FIGS. 1–3;

Figure 5A:
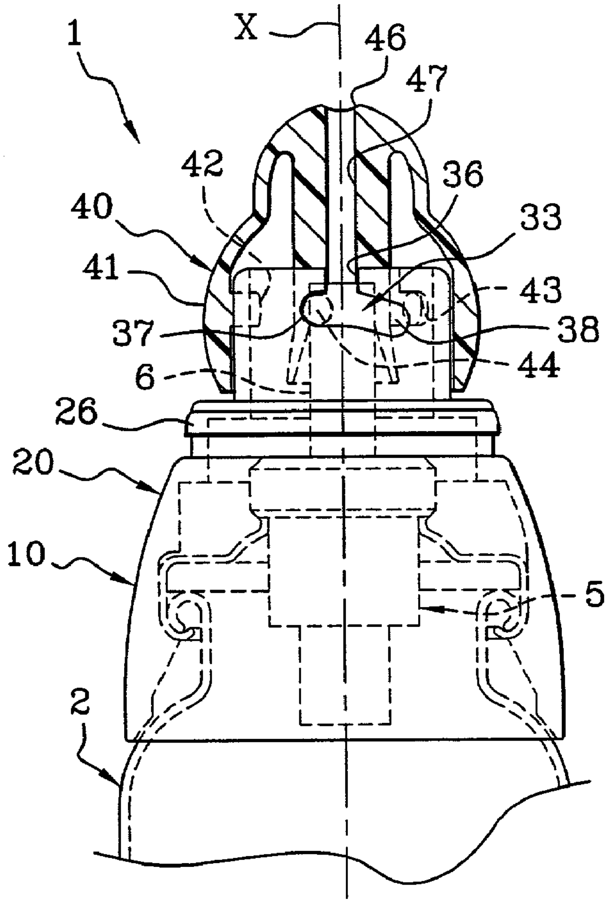
FIGS. 5A–5B illustrate the operation of the device seen in FIGS. 1–4.
Figure 5B:
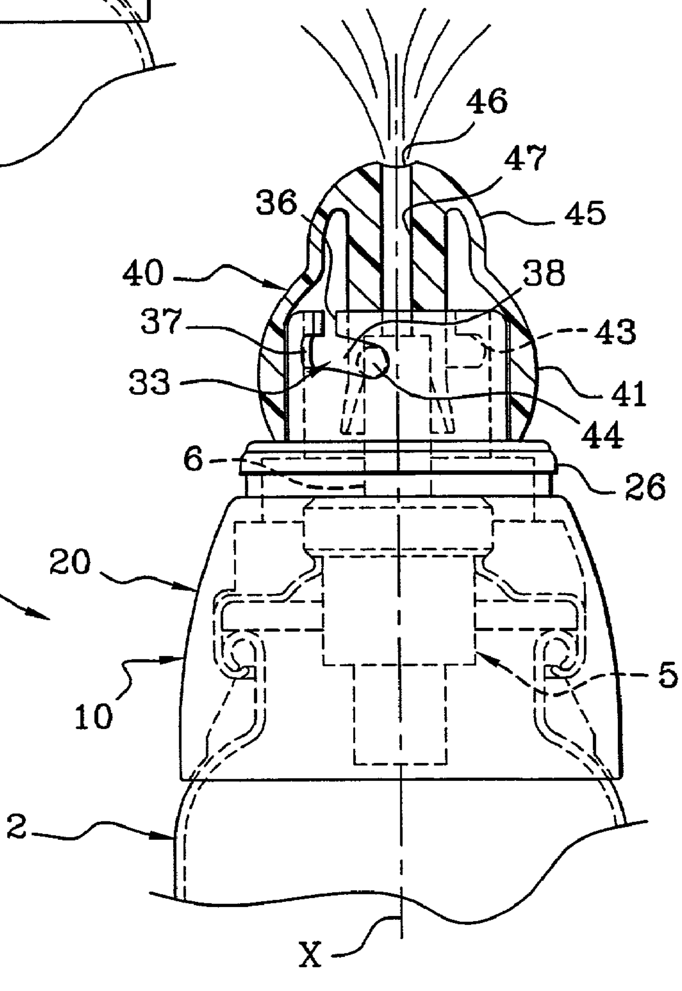

The device 1 which will now be described with reference to FIGS. 1–4 and 5A–5B comprises a tinplate can 2 with a rolled free edge defining an opening 3. A valve support 4 is crimped onto the rolled edge. The valve 5 is wholly conventional and comprises a valve stem 6 whose longitudinal axis X coincides with the axis of the valve 5. The valve stem 6 emerges on the outside of a valve body 7.

A dispensing head 10 mounted on the valve comprises a collar 20, an actuating member 40 and a cap 60.

The collar 20 comprises a fixing skirt 21, one end of which is designed to fit onto the container 2. The inside of the fixing skirt 21 comprises a plurality of beads 22, 23 for snap engagement over the bead 8 where the valve 5 is crimped to the can 2. Also formed on the inside of the fixing skirt 21 are a plurality of regularly spaced ribs 24 designed to abut against the top edge of the crimp bead 8, to give a fixed axial position of the collar 20. The fixing skirt 21 fits relatively tightly on the can 2 of effectively prevent rotation of the collar on the can 2.

In the vicinity of its open end, the fixing skirt 21 of the collar 20 is roughly cylindrical, and then reduces progressively as it extends away from the can 2.

At about the same level as the base of the emerging part of the valve stem 6, the collar 20 forms a first step 25. The step 25 is located between the fixing skirt and a cylindrical portion 27 of smaller cross section than the fixing skirt 21. About halfway up its axial height, the cylindrical skirt portion 27 comprises a bead 26 on its outer surface for snap engagement in a groove 61 on the inside of the cap 60.

The collar 20 also forms a second step 28 separating the cylindrical portion 27 from a cylindrical end skirt 29, which is of a smaller diameter than the portion 27. The end skirt 29 ends in a free edge 30. The end skirt 29 is pierced by three windows 31, 32, 33 at 120° intervals, each communicating with the free edge 30 via an opening 34, 35, 36. Each window 31, 32, 33 comprises an upstream portion 37 (with respect to the direction of rotation during opening) that is approximately perpendicular to the axis X, and a downstream portion 38 that slopes down towards the step 28. Because of its slope, the downstream portion 38 forms a ramp, whose function will be explained below in greater detail.

For each window 31, 32, 33, the opening 34, 35, 36 is angularly offset from the most upstream edge of the window. The distance is preferably about equal to the diameter of the pins, which will be discussed below in greater detail.

By way of indication, the upstream portion 37 occupies about one quarter of the angular width of the window 33. The ramp 38 occupies approximately three quarters of the angular width. The slope of the ramp 38 is approximately 20°.

The dispensing head 10 also includes an actuating member 40. The actuating member 40 includes an operating part 41 in the form of a skirt forming a truncated sphere whose outer surface has bands 48 running parallel to the axis X. The skirt 41 has an open edge 49, the distance of which from the step 28 is greater than or equal to the axial height of the ramps 38 formed by the windows 31, 32, 33.

Approximately halfway up the operating part 41 of the actuating member 40, three pins 42, 43, 44 spaced out at 120° intervals project radially from the inside of the operating part 41 to permit engagement in the windows 31, 32, 33 via their respective openings 34, 35, 36. The diameter of the pins 42, 43, 44 is slightly less than the axial height of the windows 31, 32, 33 to allows guided displacement of the pins 42, 43, 44 inside the windows 31, 32, 33.

The operating portion 41 of the actuating member is surmounted by a hemispherical dome 45 at the top of which is an outlet hole 46 preferably disposed along the axis X. An axial passage 47 extends out one end at the top of the hemispherical dome 45 via the orifice 46. The other end of the axial passage 47 is pushed onto the valve stem 6. Thus, as can be seen in the drawings, in the illustrated embodiment, the actuating member includes a first curved surface 41 and a second curved surface 45, with the second curved surface having a radius of curvature smaller than the radius of curvature of the first curved surface.

The actuating member 40 is fitted onto the collar (either before or after the latter is fitted onto the can 2) by engaging the pins 42, 43, 44 in the windows 31, 32, 33, through the openings 34, 35, 36, taking care to position the axial passage 47 at the correct angle on the valve stem 6 so that the pins 42, 43, 44 are in contact with the most upstream edge of their respective windows 31, 32, 33 (FIG. 5A). Thus, in this position, corresponding to a storage or transport position, the actuating member 40 cannot easily be detached from the collar 20, e.g. by simply being pulled off.

In this position, shown in FIG. 5A, axial pressure on the top of the dome 45, e.g. when the cap 60 (more of which later) is being put on, has no effect on the valve stem 6.

To dispense a quantity of product, the user grasps the top end of the can 2, placing thumb and middle finger in engagement with the operating portion 41 of the actuating member and placing the index finger somewhere near the outlet orifice 46. She rotates the actuating member about the axis X. As this happens, once the pins 42, 43, 44 have reached the ramps 38 formed by the windows 31, 32, 33, the pins are guided downwards in the direction of the can. This causes an axial movement of the valve stem 6. When the pins 42, 43, 44 arrive in the vicinity of the lowest point of the ramps 38 (FIG. 5B) the valve 5 opens and the product travels up the valve stem 6 and into the tubular duct 47. The product, in the form of a cream, then passes out of the device through the orifice 46 and can be collected on the user's index finger.

When the operating portion 41 of the actuating member is released, the return force of the valve spring pushes the valve stem 6 up again. As this happens, the actuating member 40 is rotated, by the action of the pins 42, 43, 44 guided along the ramps 38, in the opposite direction to the actuating direction until the pins 42, 43, 44 are once again in the vicinity of the most upstream edge of the windows 31, 32, 33.

After use, the user positions the cap 60 on the dispensing head 10 by snap-engaging the groove 61 onto the annular bead 26. In this position illustrated in section in 4, an elastomeric ball 62 mounted, e.g. by snap action, in a housing 63 formed on the inside of the closed end 64 of the cap 60 bears elastically on the outlet orifice 46.

Figure 6:
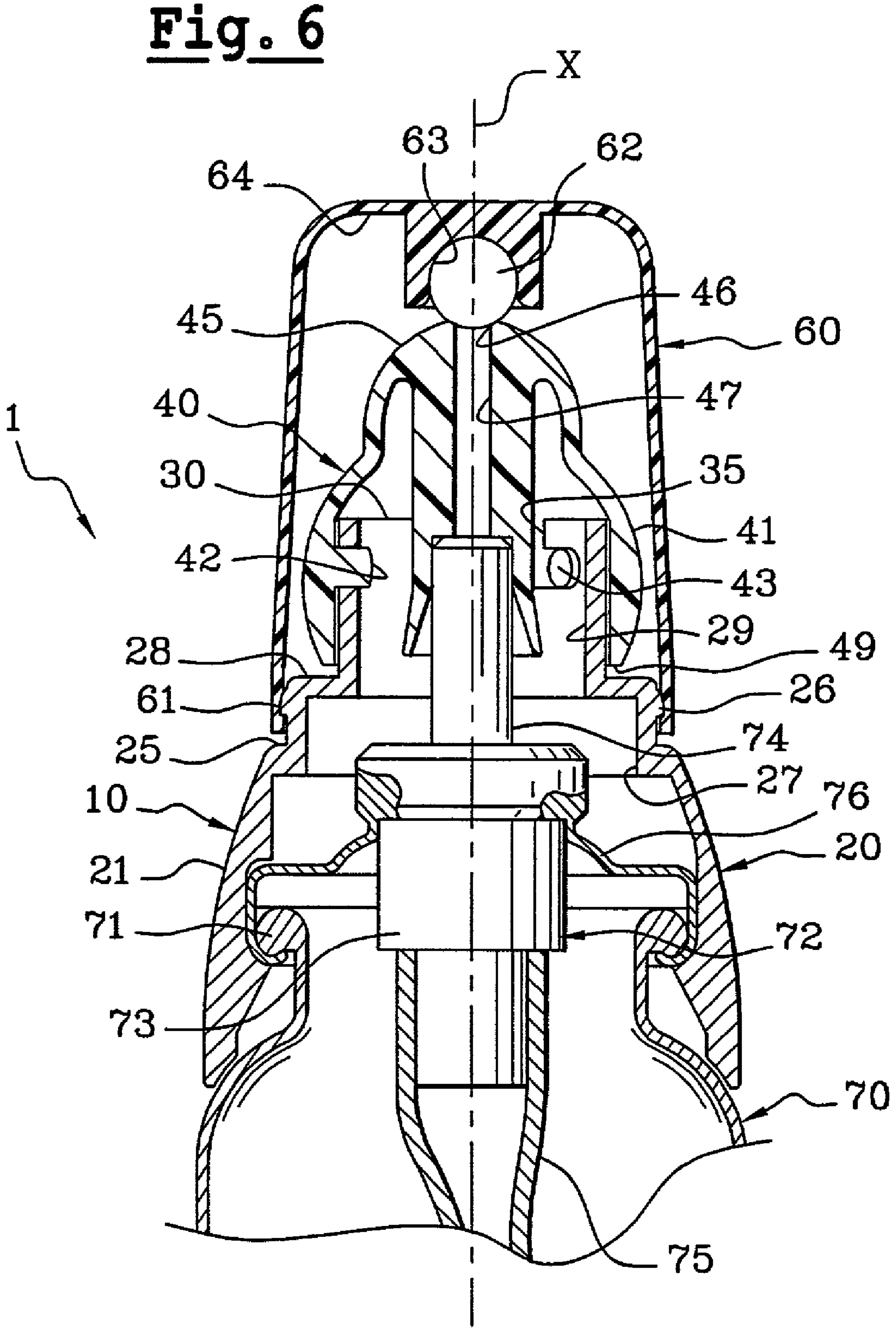
FIG. 6 relates to a second embodiment of the device of the invention.

In the embodiment illustrated in FIG. 6, the device 1 comprises a glass container 70 whose free edge forms a bean 71 defining an opening. The pump 72 is mounted on a support 76 crimped onto the bead 71. The pump 72 is connected to a dip tube 75 whose free end is situated close to the bottom of the container 70. From the body 73 of the pump 72 there emerges, in the opposite direction to the dip tube 75, a pump rod 74 on which is mounted a dispensing head 10 similar to that discussed with references to FIGS. 1–4 and 5A–5B, except that the angle of rotation of the actuating member 40 is greater than that of the actuating member 40 in the previous embodiment, because the actuating stroke of the pump 72 is longer than that of the valve 5.

The device, including its operation, is in all other respects similar to that described with reference to the previous embodiment, and consequently requires no further detailed description.

In the above detailed description, reference has been made to preferred embodiments of the invention. It will be obvious that variants can be made thereof without departing from the spirit of the invention as claimed below.

What is claimed is:

1. A device for containing and dispensing a product comprising:

(a) a container containing the product;

(b) a dispensing element associated with the container, the dispensing element including an activating member that can be moved along a longitudinal axis of the dispensing element; and (c) a dispensing head mounted on the container by a collar, the dispensing head comprising an actuating member that can be moved relative to the collar, and wherein the collar and the actuating member are coupled such that rotation of the actuating member relative to the collar causes displacement of the activating member along the longitudinal axis so that when said rotation ends, the product is free to pass through at least one outlet orifice of the dispensing head and outside said device, and wherein said axial displacement of the activating member results from the rotation of the actuating member about said longitudinal axis.

2. A device according to claim 1, wherein a driving element is disposed on one of the actuating member and the collar, and a guide element is disposed on the other of the actuating member and the collar, and wherein said driving element engages with said guide element, and further wherein said guide element includes a ramp which causes said axial displacement of the activating member when the actuating member is rotated.

3. A device according to claim 2, wherein a plurality of said driving elements and a plurality of said guide elements are provided.

4. A device according to claim 2, wherein said driving element is disposed on said actuating member and said guide element is disposed on said collar.

5. A device according to claim 4, wherein said driving element includes at least one pin.

6. A device according to claim 2, wherein the device includes three of said driving elements, and wherein said three driving elements are disposed at regularly spaced intervals, and wherein the device further includes three of said guide elements, and further wherein said three guide elements are disposed at corresponding regularly spaced intervals.

7. A device according to claim 1, wherein the actuating member is rotatable relative to the collar between a first angular position and a second angular position, and wherein an intermediate position is disposed between said first angular position and said second angular position, and further wherein rotation of the actuating member between said first angular position and the intermediate position causes substantially no axial displacement of the activating member.

8. A device according to claim 7, wherein at least one driving element is disposed on one of the actuating member and the collar, and at least one guide element is disposed on the other of the actuating member and the collar, and wherein the at least one guide element includes a ramp which engages with said at least one driving element to cause said displacement along the longitudinal axis upon rotation of said actuating member, and wherein when the actuating member is rotated between a first angular position and an intermediate position, the at least one driving element is in engagement with a portion of the corresponding guide element that is approximately perpendicular to the longitudinal axis and that is upstream of the ramp of said guide element, and when the actuating member is rotated from said intermediate position to a second angular position, said driving element travels along said ramp to dispense the product.

9. A device according to claim 2, wherein the engagement of a driving element and its associated guide element is effected via an opening which extends from a free edge of the collar.

10. A device according to claim 1, wherein the at least one outlet orifice lies on said longitudinal axis.

11. A device according to claim 1, wherein the actuating member comprises reliefs to ease rotation of the actuating member relative to the collar.

12. A device according to claim 11, wherein said reliefs include a plurality of bands.

13. A device according to claim 12, wherein said plurality of bands extend substantially parallel to said longitudinal axis.

14. A device according to claim 1, further including a removable cap for covering the outlet orifice in a storage position of the device.

15. A device according to claim 14, wherein the removable cap comprises means to seal the at least one outlet orifice when said cap is in a closed position.

16. A device according to claim 14, wherein said cap includes an elastomeric ball which seals said at least one outlet orifice when said cap is in a closed position.

17. A device according to claim 1, wherein the dispensing element is an aerosol type valve.

18. A device according to claim 1, wherein the dispensing element is a manually actuated pump.

19. A device according to claim 1, wherein said container contains a cosmetic.

20. A device according to claim 1, wherein said container contains a cream.

21. A device according to claim 1, wherein said container contains a spray product.

22. A device according to claim 1, wherein said container contains a gel.

23. A device according to claim 1, wherein said container contains a dermatological product.

24. A device according to claim 1, wherein said displacement of the activating member along the longitudinal axis to dispense the product is in a direction toward said container.

25. A device according to claim 1, wherein said rotation of said actuating member to dispense the product is on the order of a few degrees.

26. A device according to claim 1, wherein said rotation of said actuating member to dispense the product is in the range of 10 to 50 degrees.

27. A device according to claim 1, wherein the actuating member includes an inner surface and at least one projection projecting inwardly from said inner surface, and further wherein said collar includes at least one opening which receives said at least one projection, and wherein said at least one projection and said at least one opening couple said actuating member and said collar for rotation.

28. A device according to claim 27, wherein said actuating member includes reliefs to ease rotation of the actuating member relative to said collar, and further wherein said reliefs are disposed on an outer surface of said actuating member, and further wherein said reliefs are positioned at a location from which said at least one projection projects inwardly but on an opposite side of said actuating member.

29. A device according to claim 28, wherein said outer surface of said actuating member upon which said reliefs are disposed is a curved surface.

30. A device according to claim 29, wherein said actuating member is disposed over said collar such that said collar is covered by said actuating member.

31. A device according to claim 1, wherein said collar is coupled to said actuating member at a location on an inside of said actuating member and further wherein, on an outer surface of said actuating member opposing said location, said actuating member includes reliefs to ease rotation of said actuating member.

32. A device according to claim 31, wherein said outer surface of said actuating member upon which said reliefs are disposed is a curved surface.

33. A device according to claim 32, wherein said actuating member is disposed over said collar such that said collar is concealed by said actuating member.

34. A device according to claim 31, wherein said actuating member is disposed over said collar such that said location at which said collar and said actuating member are coupled is concealed.

35. A device as recited in claim 31, further including means for automatically returning said actuating member from a dispensing position at which product is dispensed from said at least one outlet orifice to a non-dispensing position at which product does not flow through said at least one outlet orifice.

36. A device as recited in claim 1, further including means for automatically returning said actuating member from a dispensing position at which product is dispensed from said at least one outlet orifice to a non-dispensing position at which product does not flow through said at least one outlet orifice.

37. A device according to claim 1, wherein said actuating member includes a curved outer surface and further wherein said actuating member receives said collar and covers said collar.

38. A device according to claim 37, wherein said curved outer surface has a shape of a truncated sphere.

39. A device according to claim 1, wherein said container contains at least one of a cosmetic and a dermatological product.

40. A device according to claim 39, wherein said device is sized and arranged such that a user can grasp said actuating member between a finger and a thumb of one hand to rotate said actuating member to dispense said product from said at least one dispensing orifice onto another finger of the one hand.

41. A device according to claim 1, wherein said actuating member defines a duct between said activating member and said outlet orifice.

42. A device according to claim 41, wherein when said rotation ends, said product is free to pass into said duct.

43. A device according to claim 42, wherein when said rotation ends, said product is free to pass from said container directly into said duct of said actuating member.

44. A device according to claim 41, wherein said duct is integral with said actuating member.

45. A device according to claim 41, wherein said duct rotates with said actuating member during said rotation.

46. A device according to claim 1, wherein said rotation of said actuating member causes said product to be dispensed outside said device through said at least one outlet orifice of the dispensing head.

47. A device for containing and dispensing a product comprising:

(a) a container containing the product;

(b) a dispensing element associated with the container, the dispensing element including an activating member that can be moved along a longitudinal axis of the dispensing element; and (c) a dispensing head mounted on the container by a collar, the dispensing head comprising an actuating member that can be moved relative to the collar, and wherein the collar and the actuating member are coupled such that rotation of the actuating member relative to the collar causes displacement of the activating member along the longitudinal axis so that when said rotation ends, the product is free to pass through at least one outlet orifice of the dispensing head outside said device;

wherein said actuating member includes a first curved surface for grasping said actuating member to rotate said actuating member, and further wherein said actuating member includes a second curved surface having a radius of curvature smaller than a radius of curvature of said first curved surface.

48. A device according to claim 47, wherein said actuating member defines a duct between said activating member and said outlet orifice.

49. A device according to claim 48, wherein when said rotation ends, said product is free to pass into said duct.

50. A device according to claim 49, wherein when said rotation ends, said product is free to pass from said container directly into said duct of said actuating member.

51. A device according to claim 48, wherein said duct is integral with said actuating member.

52. A device according to claim 48, wherein said duct rotates with said actuating member during said rotation.

53. A device according to claim 47, wherein said rotation of said actuating member causes said product to be dispensed outside said device through said at least one outlet orifice of the dispensing head.

54. A device for containing and dispensing a product comprising:

(a) a container containing the product;

(b) a dispensing element associated with the container, the dispensing element including an activating member that is movable in an axial direction to dispense the product;

(c) a dispensing head mounted on the container, wherein the dispensing head includes a rotatable actuating member, and wherein said rotatable actuating member moves in said axial direction in response to rotation of said actuating member, and further wherein a portion of said actuating member contacts said activating member to move said activating member, whereby said product is free to be dispensed outside said device when said rotation of said actuating member ends.

55. A device as recited in claim 54, wherein rotation of said actuating member to dispense said product moves said actuating member axially toward said container.

56. A device according to claim 55, wherein said actuating member includes a first surface having spherical contour with a plurality of bands thereon.

57. A device according to claim 56, wherein a second surface having a spherical contour is disposed on said first surface, and wherein an exit orifice extends through said second surface.

58. A device according to claim 54, wherein said dispensing head further includes a collar mounted to said container, and wherein said actuating member is mounted to said collar.

59. A device according to claim 58, wherein a window is disposed in one of said collar and said actuating member, said window including at least one inclined portion which is inclined relative to said axial direction, and further wherein a projection is disposed on the other of said collar and said actuating member, said projection extending into said window such that said projection engages said inclined portion upon rotation of said actuating member to cause movement of said actuating member in said axial direction.

60. A device according to claim 59, the device further including a cap, and wherein said collar includes first, second and third stepped portions, wherein said first stepped portion is coupled to said container, said second stepped portion receives said cap, and said actuating member is mounted to said third stepped portion.

61. A device according to claim 60, wherein said actuating member includes a first curved surface for grasping said actuating member to rotate said actuating member, the actuating member further including a second curved surface through which an exit orifice of said dispensing head extends.

62. A device according to claim 61, wherein said cap includes means to form a seal against said exit orifice when said cap is mounted on said collar.

63. A device according to claim 61 wherein said means to form a seal includes a spherical member.

64. A device according to claim 61, wherein said second curved surface has a radius of curvature smaller than a radius of curvature of said first curved surface.

65. A device according to claim 54, wherein said container contains one of a cosmetic product and a dermatological product.

66. A device according to claim 59, wherein said window includes a substantially flat portion such that as said actuating member is rotated and said projection travels along said substantially flat portion said product is not dispensed.

67. A device according to claim 54, wherein the rotatable actuating member includes an inner surface and at least one projection projecting inwardly from said inner surface, and further wherein at least one opening is associated with said container and said at least one opening receives said at least one projection, and wherein said at least one projection and said at least one opening rotatably couple said rotatable actuating member and said container.

68. A device according to claim 67, wherein said actuating member includes reliefs to ease rotation of the rotatable actuating member, and further wherein said reliefs are disposed on an outer surface of said rotatable actuating member, and further wherein said reliefs are positioned at a location from which said at least one projection projects inwardly but on an opposite side of said rotatable actuating member.

69. A device according to claim 68, wherein said outer surface of said rotatable actuating member upon which said reliefs are disposed is a curved surface.

70. A device according to claim 69, wherein said rotatable actuating member is disposed over said at least one opening such that said at least one opening is covered by said actuating member.

71. A device according to claim 54, wherein said rotatable actuating member is coupled to said container at a location on an inside of said rotatable actuating member and further wherein, on an outer surface of said rotatable actuating member opposing said location, said rotatable actuating member includes reliefs to ease rotation of said rotatable actuating member.

72. A device according to claim 71, wherein said outer surface of said rotatable actuating member upon which said reliefs are disposed is a curved surface.

73. A device according to claim 72, wherein said curved surface is a section of a sphere.

74. A device according to claim 71, wherein said rotatable actuating member is disposed over a portion of said container such that said location at which said container and said rotatable actuating member are coupled is concealed.

75. A device as recited in claim 71, further including means for automatically returning said rotatable actuating member from a dispensing position at which product is dispensed from said container to a non-dispensing position at which product does not flow from said container.

76. A device as recited in claim 54, further including means for automatically returning said rotatable actuating member from a dispensing position at which product is dispensed from said container to a non-dispensing position at which product does not flow from said container.

77. A device according to claim 54, wherein said container includes a collar and wherein said rotatable actuating member is coupled to said container at least one location on said collar, and further wherein said rotatable actuating member receives said collar to cover said collar and said at least one location.

78. A device according to claim 77, wherein said rotatable actuating member includes a curved outer surface having a shape of a truncated sphere.

79. A device according to claim 54, wherein said container contains at least one of a cosmetic and a dermatological product.

80. A device according to claim 79, wherein said device is sized and arranged such that a user can grasp said rotatable actuating member between a finger and a thumb of one hand to rotate said rotatable actuating member to dispense said product from said device onto another finger of the one hand.

81. A device according to claim 54, wherein said rotatable actuating member includes an outer surface having a shape of a truncated sphere and wherein said rotatable actuating member further includes a domed surface disposed above said outer surface having a shape of a truncated sphere.

82. A device according to claim 54, wherein said actuating member defines a duct between said activating member and an outlet orifice of said dispensing head.

83. A device according to claim 82, wherein when said rotation ends, said product is free to pass into said duct.

84. A device according to claim 83, wherein said rotation ends, said product is free to pass from said container directly into said duct of said actuating member.

85. A device according to claim 82, wherein said duct is integral with said actuating member.

86. A device according to claim 82, wherein said duct rotates with said actuating member during said rotation.

87. A device according to claim 54, wherein said rotation of said actuating member causes said product to be dispensed outside said device through an outlet orifice of the dispensing head.

* * * * *